(12) United States Patent  
Dragovich et al.

(10) Patent No.: US 12,493,003 B2  
(45) Date of Patent: Dec. 9, 2025

(54) DETECTOR WITH FOCALLY ALIGNED PIXELS

(71) Applicant: General Electric Company, Schenectady, NY (US)

(72) Inventors: Matthew Edward Dragovich, Evendale, OH (US); Joseph Lacey, Madison, WI (US)

(73) Assignee: General Electric Company, Schenectady, NY (US)

( * ) Notice: Subject to any disclaimer, the term of this patent is extended or adjusted under 35 U.S.C. 154(b) by 220 days.

(21) Appl. No.: 18/221,557

(22) Filed: Jul. 13, 2023

(65) Prior Publication Data

US 2025/0020599 A1    Jan. 16, 2025

(51) Int. Cl.
*G01N 23/04* (2018.01)
(52) U.S. Cl.
CPC .................... *G01N 23/04* (2013.01)
(58) Field of Classification Search
CPC ....... A61B 6/032; A61B 6/037; A61B 6/4258; A61B 6/4417; A61B 6/5235; A61B 2090/374; A61B 2090/3762; A61B 6/03; G01T 1/1611
See application file for complete search history.

(56) References Cited

U.S. PATENT DOCUMENTS

| | | | |
|---|---|---|---|
| 6,167,110 A * | 12/2000 | Possin | G01T 1/201 250/370.11 |
| 6,215,853 B1 | 4/2001 | Kump | |
| 6,408,049 B1 | 6/2002 | Edic | |
| 6,502,985 B1 | 1/2003 | Garland | |
| 7,340,033 B2 | 3/2008 | Mollus | |
| 7,489,765 B2 | 2/2009 | Yi | |
| 8,340,246 B2 | 12/2012 | Kang | |
| 8,929,678 B2 | 1/2015 | Újvári | |
| 9,188,550 B2 | 11/2015 | Joyce | |
| 9,599,577 B2 | 3/2017 | Engel | |
| 10,470,722 B2 | 11/2019 | Engel | |
| 11,221,424 B2 | 1/2022 | Vecchio | |
| 2004/0037393 A1 | 2/2004 | Birdwell | |
| 2020/0222024 A1 | 7/2020 | Edic | |
| 2023/0135695 A1 | 5/2023 | Ollier | |

FOREIGN PATENT DOCUMENTS

| | | |
|---|---|---|
| CN | 1915169 | 2/2007 |
| EP | 3951436 | 2/2022 |
| FR | 3129428 | 5/2023 |
| FR | 3129436 | 5/2023 |
| FR | 3129690 | 6/2023 |
| FR | 3129970 | 6/2023 |
| FR | 3129972 | 6/2023 |

(Continued)

*Primary Examiner* — Courtney D Thomas
(74) *Attorney, Agent, or Firm* — Smith Gambrell & Russell LLP

(57) ABSTRACT

A system comprises an energy source and detector. The energy source is configured to emit energy from a focal spot. The detector comprises an array of pixels. Each of the pixels of the array of pixels has a centerline extending longitudinally through the pixel. The centerline of each pixel is focally aligned with the focal spot of the energy source. Each of the pixels receives selected amounts of the energy from the energy source that have passed through an object.

7 Claims, 5 Drawing Sheets

(56) References Cited

FOREIGN PATENT DOCUMENTS

| | | |
|---|---|---|
| FR | 3130747 | 6/2023 |
| FR | 3130874 | 6/2023 |
| FR | 3130895 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |
| WO | 2010007544 | 1/2010 |

* cited by examiner

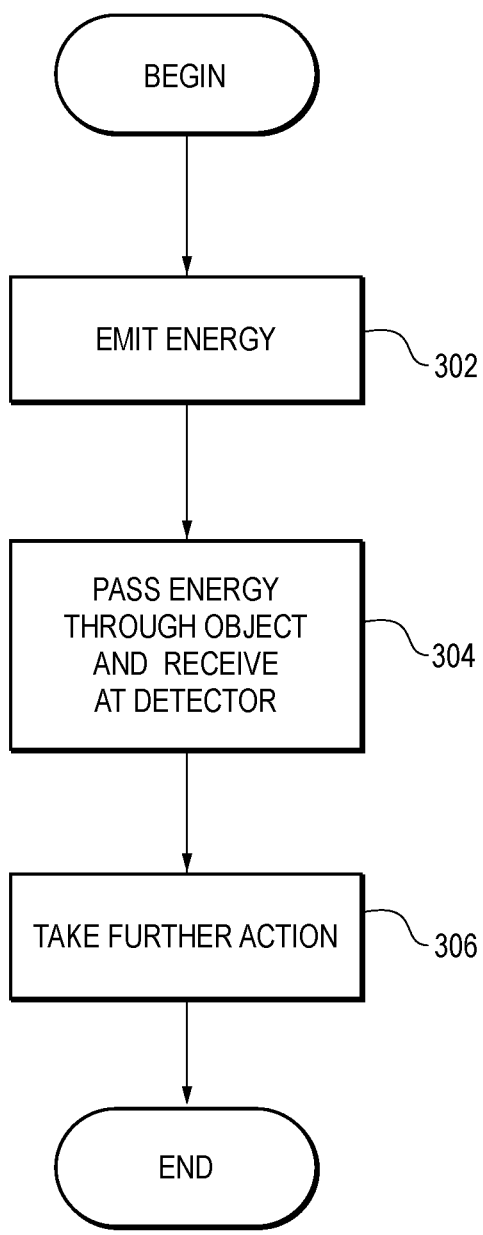

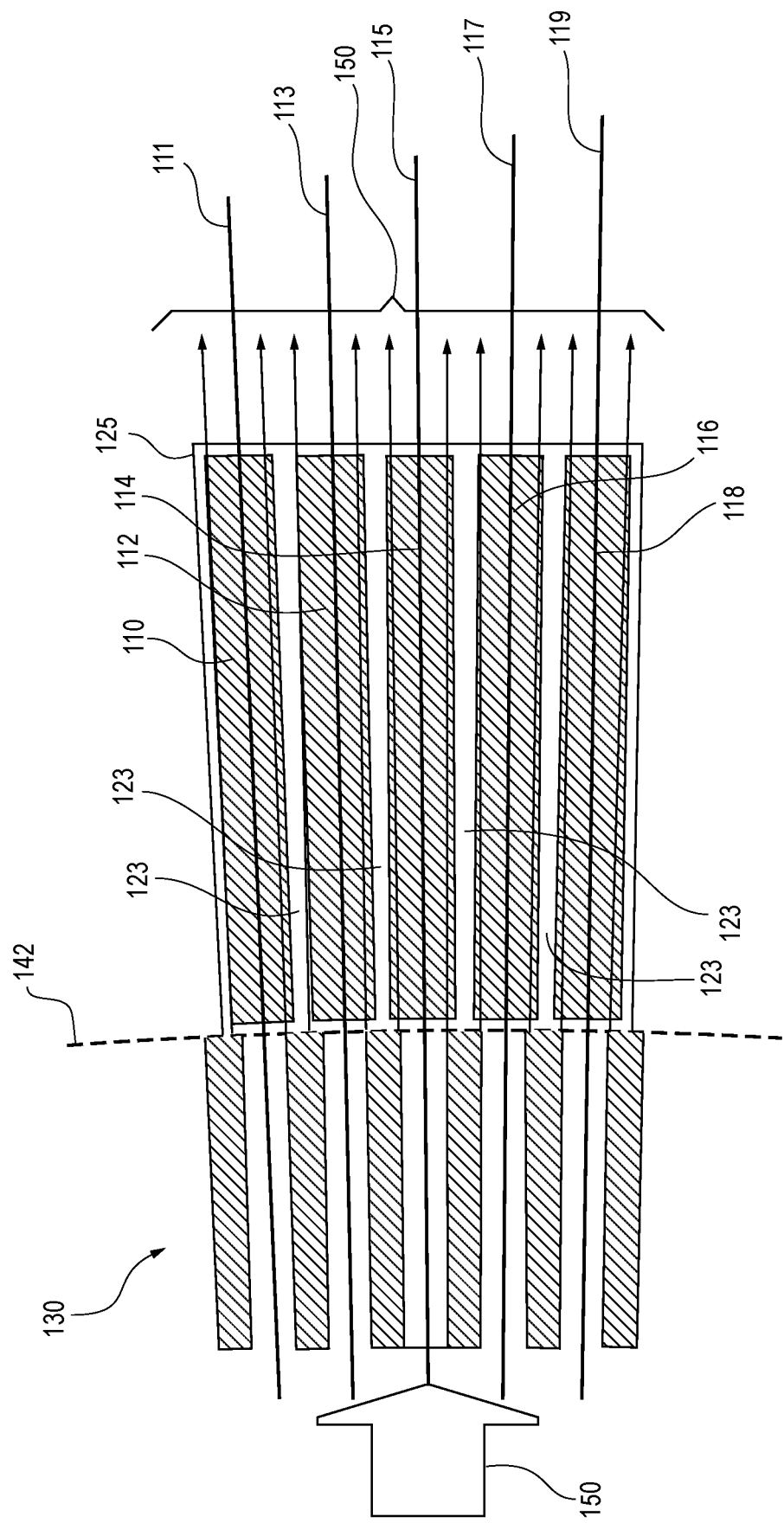

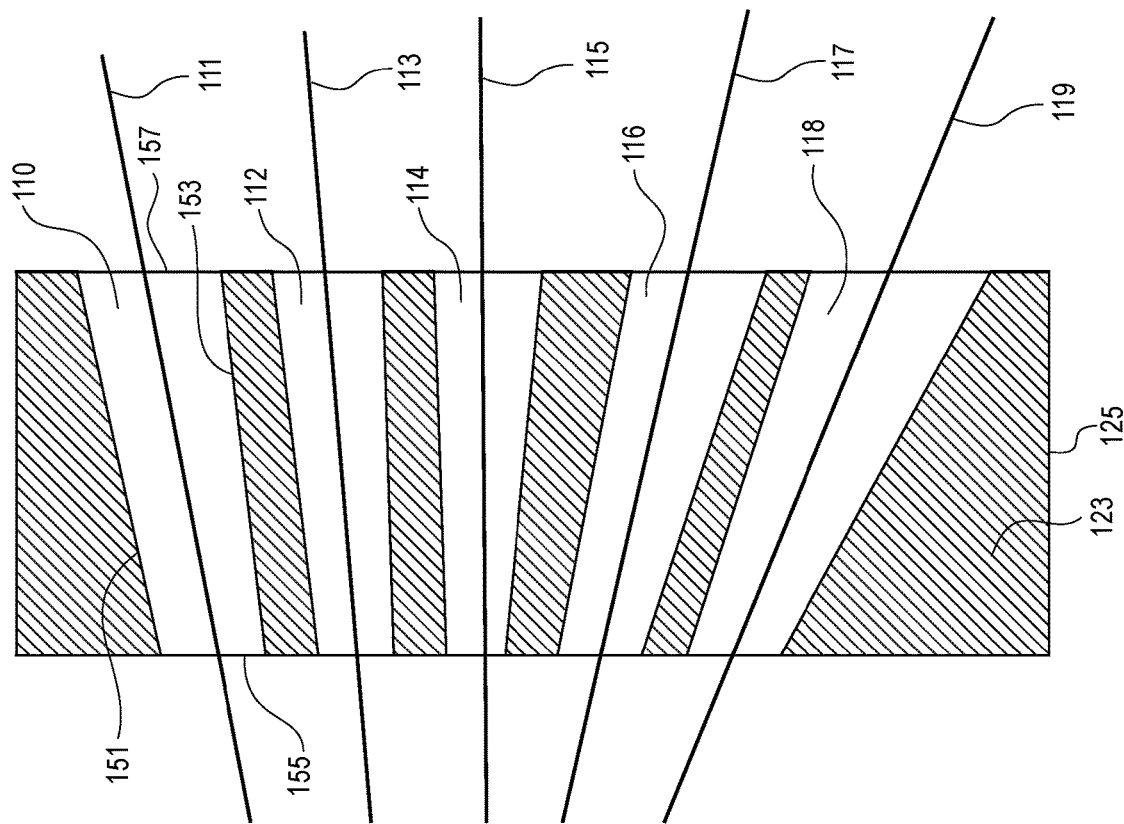
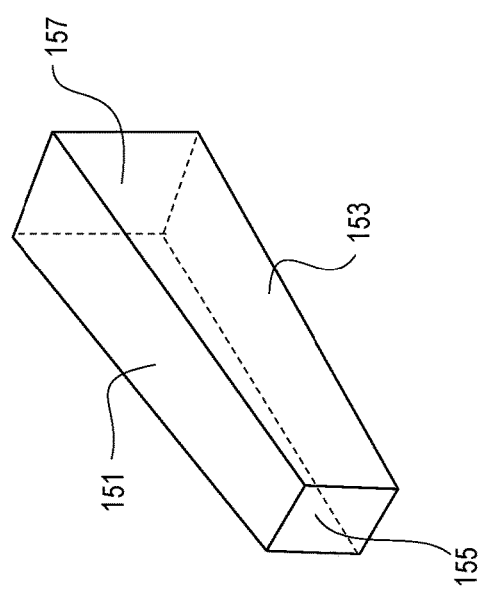

DETECTOR WITH FOCALLY ALIGNED PIXELS

TECHNICAL FIELD

The technical field relates to energy detection and, more specifically, to energy detectors used to detect indications or anomalies in objects.

BACKGROUND

Computerized tomography (CT) scanning technology uses x-rays, which are directed towards an object by an x-ray source. The x-rays pass through the object and are received by a detector. CT scanning has been used in the medical field but can also be used in other applications such as in scanning engine aircraft parts. In the context of engine aircraft parts, CT scanning can be used to detect indications and anomalies in these parts. Once these are detected, further decisions can be made regarding part disposition.

BRIEF DESCRIPTION OF THE DRAWINGS

Various needs are at least partially met through provision of approaches for scanning objects that use a focally aligned pixel array, particularly when studied in conjunction with the drawings. A full and enabling disclosure of the aspects of the present description, including the best mode thereof, directed to one of ordinary skill in the art, is set forth in the specification, which refers to the appended figures, in which:

FIG. 3 comprises a flowchart of operating a scanning system in accordance with various embodiments of these teachings;

FIG. 4 comprises a diagram of a rectangular pixel array in accordance with various embodiments of these teachings;

FIG. 5A comprises a diagram of a trapezoid shaped pixel in accordance with various embodiments of these teachings; and FIG. 5B comprises a diagram of a trapezoid shaped pixel array used in a detector in accordance with various embodiments of these teachings.

Figure 1:
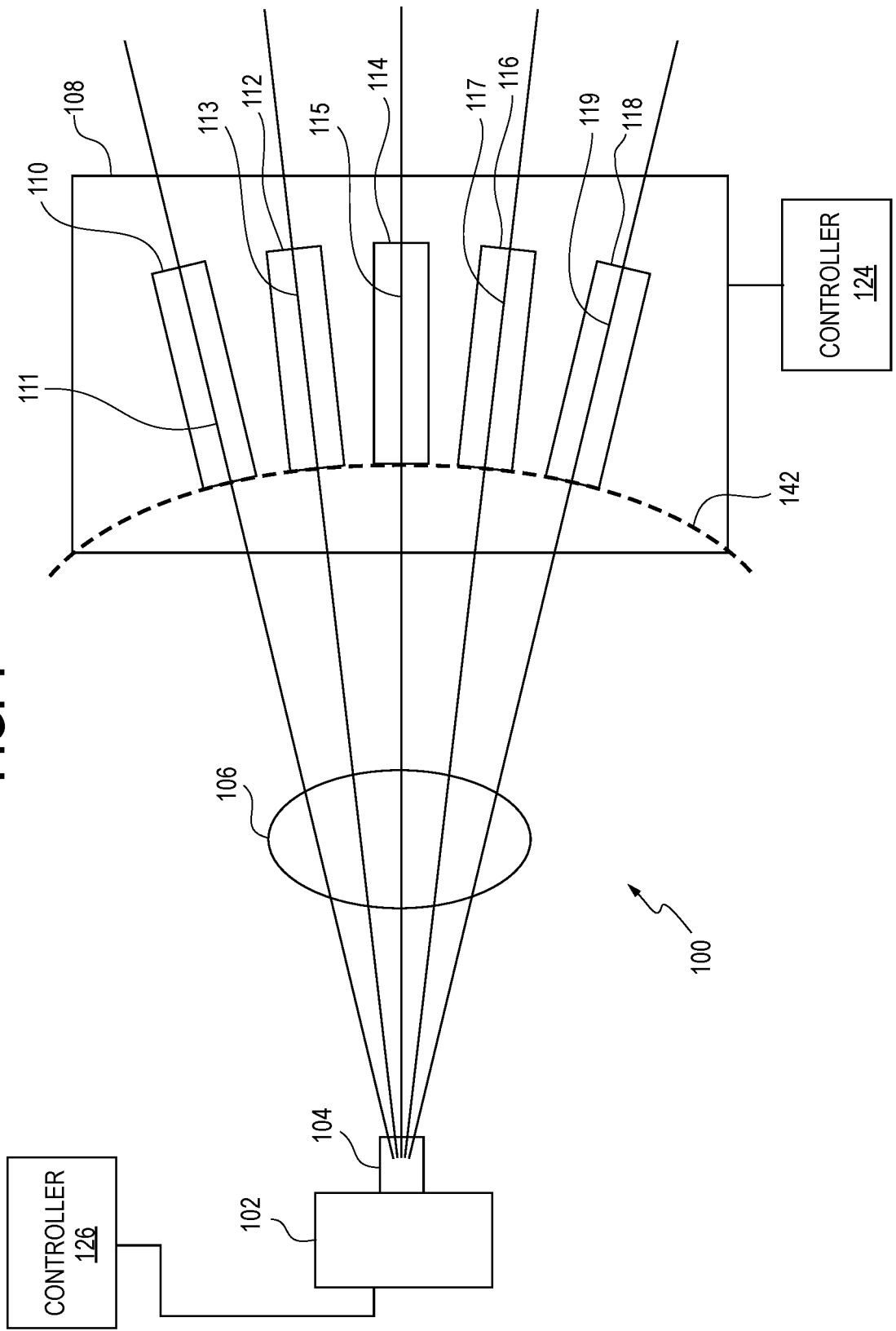
FIG. 1 comprises a block diagram of a scanning system in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/ or steps may be described or depicted in a particular order of occurrence while those skilled in the art will understand that such specificity with respect to sequence is not actually required.

DETAILED DESCRIPTION

In the approaches provided herein, an x-ray sensor array or detector (e.g., a grouping of scintillator pixels) is constructed such that the centerline of each pixel is focally aligned to the focal spot of an x-ray source. In one example, rectangular pixels of the detector are arrayed along an arc. In another example, each of the pixels is cut in the shape of a trapezoid (as viewed in the longitudinal cross section) to have the pixel outer edges radially aligned with the x-ray beam. Either construction enables thinner pixels to be used in the detector, which in turn enables building detection modules with smaller geometric pitch. These structures improve alignment capability for reduced image artifact issues and enable higher spatial resolution due to reduced pixel pitch.

Advantageously, the approaches provided herein ensure optimal alignment of the x-ray beam pixels (e.g., sensor scintillator pixels) in a detector. Collimators can be used in these approaches where the collimators are placed between the energy source and the object and/or between the object and the detector. When a collimator is used, the present approaches ensure proper alignment of the collimator with the sensor scintillator pixel. The images produced by these approaches avoid image problems that are caused by misalignment such as the inclusion of image artifacts including streaks, bands, rings etc. The present approaches are especially useful in high energy CT scanners, where the pixel depth of the x-ray sensor becomes extremely deep (on the order of 20-50 mm). This is compared to medical CT scanners (where the pixel depth is on the order of 2-3 mm).

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description.

Referring now to FIG. 1, a system 100 includes an energy source 102 (which may also be referred to as an emitter) that emits energy from a focal spot 104. An object 106 is disposed in the path of the energy emitted from the focal spot 104. As such, the object 106 receives energy from the energy source 102. At least some of the energy passes through the object 106.

The system 100 includes a detector 108. The detector 108 receives the energy from the energy source 102 that passes through the object 106. In aspects, the detector 108 comprises an array of pixels 110, 112, 114, 116, and 118. Each of the pixels 110, 112, 114, 116, and 118 of the array has a centerline 111, 113, 115, 117, and 119 extending longitudinally through each pixel (as used herein, the longitudinal direction is the direction of travel or movement of the x-rays from the energy source 102). Each centerline 111, 113, 115, 117, and 119 of each pixel 110, 112, 114, 116, and 118 is focally aligned with the focal spot 104 of the energy source. By "focal alignment," it is meant that the centerline extends to the focal spot 104. Each pixel receives selected amounts of the energy from the energy source 102 that have passed through the object 106.

The energy source 102 is in one example, an x-ray source that emits radiation in the x-ray wavelengths. For example, a cathode (e.g., a filament) of the energy source 102 is heated to produce electrons. A potential voltage (e.g., measured in kilovolt range) in the x-ray tube directs these into a target (anode), which produces x-rays. The focal spot 104 is defined to be the area of apparent source of the x-rays. In this case, the focal spot 104 is the area of the anode surface which receives the beam of electrons from the cathode and is the apparent source of the x-rays (as viewed from the detector 108).

The focal spot 104 may vary in area. Generally speaking, the larger the area of the focal spot, the poorer is the detail in the x-ray image that is eventually obtained. This result is due, in aspects, to the larger the area of penumbra or edge un-sharpness associated with the image. As described herein the energy source 102 is an x-ray energy source, but it will be understood that other examples of energy sources that operate in different frequency ranges or wavelengths are possible.

The object 106 may be any object that is set to be imaged. In one example, the object 106 may be an aircraft engine part (e.g., a turbine blade, stator, rotor hub, etc.). In other examples, the object 106 may be a part of another industrial machine. In still other examples, the object may be a human or part of a human.

The detector 108 (also called array of pixels herein) comprises the pixels 110, 112, 114, 116, and 118, which form an array. The detector 108 may also include electronics or electrical devices that alter or process the energy that is received by the pixels 110, 112, 114, 116, and 118.

The detector 108 may also be referred to as a focally aligned pixel array since each of its pixels 110, 112, 114, 116, and 118 is aligned with the focal spot 104 of the energy source 102. It will be understood that for simplicity the example of FIG. 1 shows only five pixels in one direction and that any number of pixels is possible. For example, the detector may be a rectangular two dimensional array of pixels (e.g., 1,000 pixels by 1,000 pixels). In other examples, the array of pixels can include other numbers of pixels (e.g., 2, 3, 4, etc.) and/or be arranged in other one dimensional or two dimensional configurations.

Each pixel 110, 112, 114, 116, 118 may be made of a scintillator such as Lumex. In one example, the dimensions of each of the pixels 110, 112, 114, 116, and 118 are 80 mm by 10 mm by 10 mm. In other examples, the pixels can have different dimensions and/or be constructed of other materials.

A photodiode or other conversion circuitry may be attached to the backside of each of the pixels 110, 112, 114, 116, 118 or incorporated with each of the pixels 110, 112, 114, 116, 118. The absorbed x-rays produce light in the scintillator, which is converted into an electrical current. The intensity of the current that is produced is proportional to the energy received.

As mentioned, the centerlines 111, 113, 115, 117, and 119 extend through each of the pixels 110, 112, 114, 116, 118 in a longitudinal direction and through the center of the corresponding pixel 110, 112, 114, 116, 118. The centerlines 111, 113, 115, 117, and 119 are in focal alignment with the focal spot 104. Focal alignment means the centerline 111, 113, 115, 117, and 119 aligns or intersects with some part of the focal spot 104. In some instances, all centerlines 111, 113, 115, 117, and 119 intersect with the same point in the focal spot 104 while in other examples, the centerlines 111, 113, 115, 117, and 119 align with different points within the same focal spot 104. It will be appreciated that the focal spot 104 is, in fact, an area, and not a single mathematical point. The pixels 110, 112, 114, 116, and 118 are built and/or arranged along an arc 142. As such, in some aspects, each of the pixels 110, 112, 114, 116, and 118 is the same distance from the focal spot 104. The radius of the arc 142, in aspects, is based upon the distance to the focal spot 104. The centerlines 111, 113, 115, 117 and 119 intersect with the arc 142. In aspects, the energy source 102 and the detector 108 are coupled together by a structure such as a mounting structure, housing and/or bracket that maintains a fixed distance between these elements. In other examples, the energy source 102 and the detector 108 can be completely different parts positioned on a platform such as a workbench.

Because of the alignment, each pixel 110, 112, 114, 116, 118 provides an improved alignment as compared to previous approaches where alignment was not made. In other words, the pixels further from the center (110, 118) are in the same focal alignment as the center pixel (114). Since all pixels 110, 112, 114, 116, and 118 are aligned, significantly improved image quality is provided.

The focally aligned rectangular pixel arrays provided can support much deeper pixel length (in the x-ray direction). If the focally aligned pixel had a trapezoidal cross-section, then pixel length could be theoretically infinite thereby making the length as long as needed. A deeper focal length is an advantage because of potential detection sensitivity improvement.

The system 100 includes a first controller 124 that may be communicatively coupled to the detector 108. The first controller 124 receives information from the detector 108 that include the electrical signals generated by the pixels 110, 112, 114, 116, and 118 and may be coupled to a user electronic device with a display screen (e.g., a personal computer, laptop, or smartphone to mention a few examples). The first controller 124 can be any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc.

The first controller 124 may be configured (for example, by using corresponding programming stored in a memory) to carry out one or more of the steps, actions, and/or functions described herein such as processing and displaying information received from the detector 108. The first controller 124 may include a memory that includes computer instructions that implement any of the functions described herein.

The system 100 also includes a second controller 126 that may be communicatively coupled to the energy source 102. In one example, the second controller 126 may activate/deactivate the energy source, adjust the power of the energy source 102, adjust the timing of the x-rays directed from the energy source 102, and/or otherwise control operation of the energy source 102. The second controller 126 can also receive instructions from human operators (e.g., via an electronic interface such as a personal computer, laptop, or smartphone to mention a few examples) to control the operation of the energy source 102. The structure of the second controller 126 may be the same or similar to the structure of the first controller 124. Both controllers 124 and 126 may also be part of the same controller or computer system.

Figure 2:
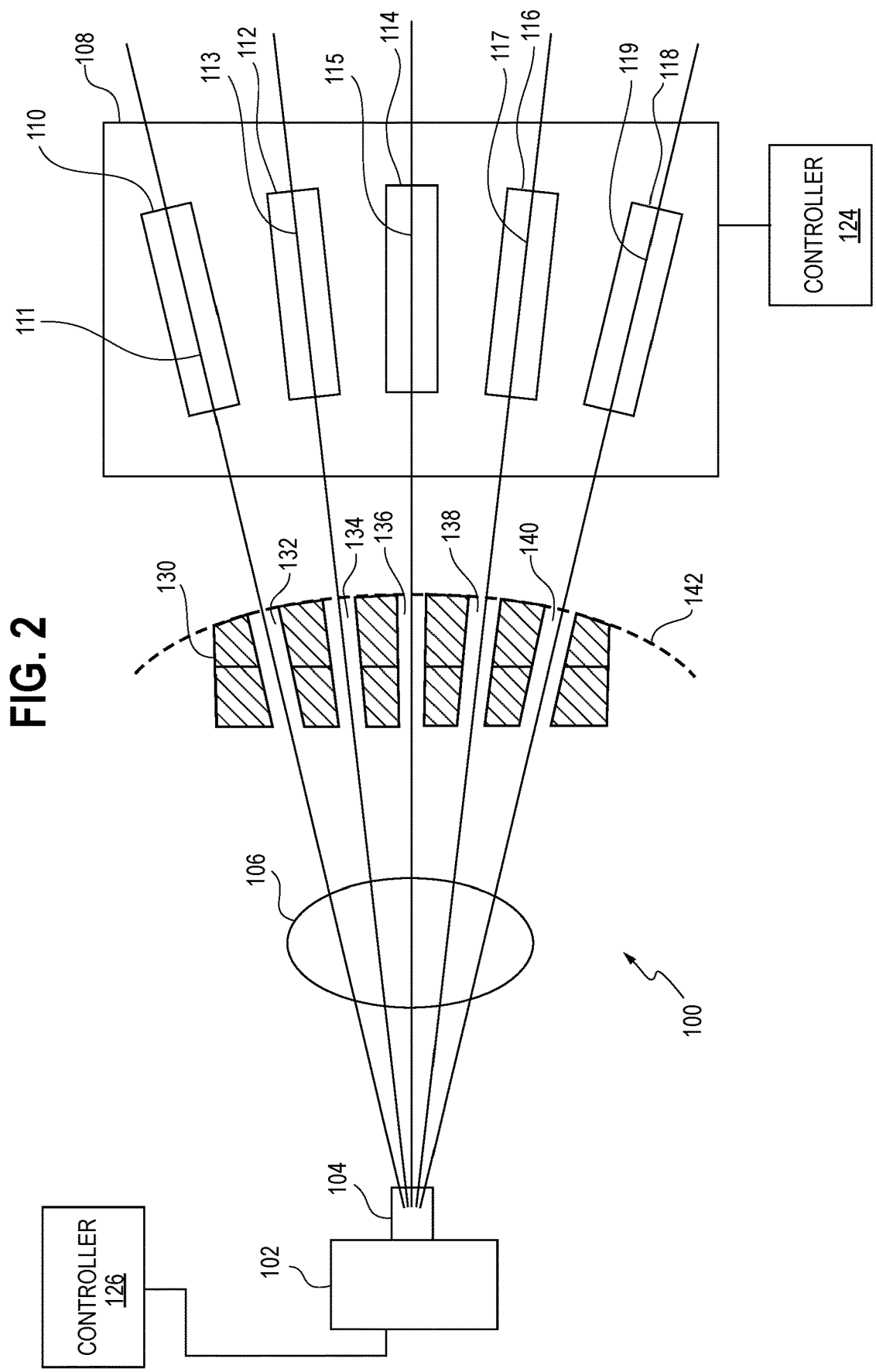
FIG. 2 comprises a block diagram of a scanning system in accordance with various embodiments of these teachings.

Referring now to FIG. 2, another example of a system 100 includes an energy source 102 that emits energy from the focal spot 104. The system 100 shown in FIG. 2 is similar to the system of FIG. 1 in its components except that a collimator 130 is disposed between the object 106 and the detector 108. All other elements are the same and like-number elements in FIG. 2 are similar or the same as like-numbered elements in FIG. 1. Their description will not be repeated here. The use of the collimator 130 is advantageous in some circumstances such as where off focal alignment causes artifacts and decreased sensitivities in the resultant data.

Although the collimator 130 of FIG. 2 is disposed between the object 106 and the detector 108, it will be appreciated that the collimator 130 may be disposed at other positions such as between the energy source 102 and the object 106. In addition, systems with multiple collimators can also be provided. In one example system, one collimator is disposed between the energy source 102 and the object 106 and another collimator is disposed between the object 106 and the detector 108.

The collimator 130 is configured to direct the x-ray beams received from the energy source 102 in a parallel direction with respect to slots 132, 134, 136, 138, and 140 in the collimator 130. In these regards, x-rays not traveling in the parallel direction (as to the slots 132, 134, 136, 138, and 140) may be absorbed by the sides of the slots 132, 134, 136, 138, and 140. In aspects, the collimator 130 is built on the arc 142 and is also focally aligned to the focal spot 104. It can be seen that the pixels 110, 112, 114, 116, and 118 are each aligned to a corresponding one of the slots 132, 134, 136, 138, and 140. It can be further seen that the centerlines 111, 113, 115, 117, and 119 travel through the center of the slots 132, 134, 136, 138 and 140 and the centerlines are focally aligned with the focal spot 104.

Referring now to FIG. 3, one example of an approach for operating a system to obtain images is described.

At step 302, energy is emitted from the focal spot 104 of an energy source 102. At least some of the energy passes through the object 106. In one example, as mentioned the energy source 102 is an x-ray source but other examples are possible. In aspects, the second controller 126 controls or activates the energy source 102 to emit the energy.

At step 304, at least some of the energy that has passed through the object 106 is received at the detector 108 (the array of pixels 110, 112, 114, 116, and 118). As mentioned, each of the pixels 110, 112, 114, 116, and 118 of detector 108 has a centerline 111, 113, 115, 117, and 119 extending longitudinally through the pixel 110, 112, 114, 116, and 118. Each centerline 111, 113, 115, 117, and 119 of each pixel 110, 112, 114, 116, and 118 is focally aligned with the focal spot 104 of the energy source 102.

The energy received at the detector 108 can be adjusted by built-in electronic elements (e.g., amplifiers, filters, etc.) or components (e.g., resistors, diodes, transistors, and capacitors) that are incorporated or built into each of the pixels 110, 112, 114, 116 and 118. Furthermore, the first controller 124 may obtain electrical signals representing this received energy to perform further processing on the electrical signals such as filtering, noise removal, and so forth. Then, the controller 124 may format and display the received energy as an image to users (e.g., at a user electronic device such as a personal computer, laptop, or smartphone to mention a few examples).

Once the image is examined, further actions can be taken at step 306. For example, if the object 106 is an aircraft engine part an indication or anomaly (e.g., a crack) may be determined by manually or automatically examining the image. The part can be discarded or repaired. For example, if a crack were to be detected, then the crack in the part can be repaired by any appropriate method or approach such as welding or sealing the crack. Then, the part can be re-checked to ensure the crack was fixed.

Referring now to FIG. 4, one example of an array of pixels 110, 112, 114, 116, and 118 where the pixels 110, 112, 114, 116, and 118 are rectangular in the longitudinal cross section (along the direction of travel of the x-rays). Centerlines 111, 113, 115, 117, and 119 pass through each pixel. The centerlines 111, 113, 115, 117, and 119 are aligned with the focal spot 104 (as shown in FIG. 1). The example of FIG. 4 shows the detector (array) 108 with a collimator 130, but it will be appreciated that the collimator 130 may not be used. X-rays 150 from an x-ray source (not shown in FIG. 4) pass through the collimator 130 and enter the detector 108. In this example, the rectangular pixels of the detector 108 are arrayed along the arc 142 (as can be the collimator 130). The radius of the arc 142 in aspects is the distance to the focal spot 104.

It can be seen that the centerlines 111, 113, 115, 117, and 119 are not disposed in parallel relation to each other. Instead, the pixels 110, 112, 114, 116, and 118 are adjusted or tilted so that the centerlines 111, 113 are at different angles with respect to the centerline 115. Similarly, the centerlines 117, 119 are at different angles with respect to the centerline 115. The amount of angular adjustment or tilting can be determined by experiment and/or mathematical calculations or analysis to ensure that the centerlines 111, 113, 115, 117, and 119 are focally aligned to the focal spot 104 of the energy source 102.

Insulator (or shielding material) 123 is disposed between the pixels 110, 112, 114, 116, and 118. A casing 125 (formed of the insulator 123) can be formed with slots in the casing where the pixels 110, 112, 114, 116, and 118 are disposed. The insulator 123 may further absorb stray x-rays and improve image quality. In one example, the insulator 123 may be formed of tungsten or steel. Other example materials are possible. Generally speaking, the detector 108 does not present a uniform flat surface to the energy source 102 because each of the pixel surfaces (facing the energy source 102) is rectangular and is tilted at differing angles than others of the pixels 110, 112, 114, 116, and 118.

Referring now to FIG. 5A and FIG. 5B, one example of an array of pixels 110, 112, 114, 116, and 118 where the pixels 110, 112, 114, 116, and 118 are trapezoidal in the longitudinal cross section (along the direction of travel of the x-rays). By "trapezoidal", it is meant a quadrilateral with only one pair of parallel sides. In this example, each of the pixels 110, 112, 114, 116, and 118 is cut in the shape of a trapezoid (as viewed in the longitudinal cross section) to have the pixel outer edges radially aligned with the x-ray beam.

Centerlines 111, 113, 115, 117, and 119 pass through each pixel. The centerlines 111, 113, 115, 117, and 119 are aligned with the focal spot 104 (as shown in FIG. 1).

It can be seen that the centerlines 111, 113, 115, 117, and 119 are not disposed in parallel relation to each other. Instead, the pixels 110, 112, 114, 116, and 118 are shaped in a cross sectional trapezoidal shape so that the centerlines 111, 113 are at different angles with respect to the centerline 115. Similarly, the centerlines 117, 119 are at different angles with respect to the centerline 115. The exact shaping of the trapezoidal cross sections is determined by experiment and/or calculations to ensure that the centerlines 111, 113, 115, 117, and 119 are focally aligned to the focal spot of the energy source 102. Generally speaking, the detector presents a flat surface to the energy source 102 because of the trapezoidal shaping of the pixels 110, 112, 114, 116, and 118.

In the example of FIG. 5A and FIG. 5B, the pixels 110, 112, 114, 116, and 118 are shaped (in the cross section) are trapezoids. For example, as shown in FIG. 5A and FIG. 5B, top and the bottom surfaces 151, 153 of each of the pixels 110, 112, 114, 116, and 118 are not parallel. Front and back surfaces 155 and 157 of the pixels 110, 112, 114, 116, and 118 are parallel to each other. Generally speaking, the top and bottom surfaces 151, 153 are aligned with the direction of the x-rays. This results in the trapezoidal cross section of the pixels 110, 112, 114, 116, and 118.

Insulator 123 is disposed between the pixels 110, 112, 114, 116, and 118. A casing 125 can be formed with slots in the casing where the pixels 110, 112, 114, 116, and 118 are disposed. As with the example of FIG. 4, the insulator 123 may further absorb stray x-rays and improve image quality.

Advantageously, the present approaches provide locally aligned pixels in x-ray sensor module. These approaches provide increased mis-alignment sensitivities and reduce image artifacts. The present approaches also enable smaller pixel width and pitch which improves spatial resolution. Further, these approaches enable increased pixel lengths (in the x-ray direction), which enable higher energy capable modules (more x-ray stopping power due to increased depth or length of pixel).

Further aspects of the invention are provided by the subject matter of the following clauses:

A system, the system comprising: an energy source to emit energy from a focal spot toward an object; and a detector, the detector comprising an array of pixels, each of the pixels of the array of pixels having a centerline extending longitudinally through the pixel, the centerline of each of the pixels being focally aligned with the focal spot of the energy source, each of the pixels receiving energy from the energy source that has passed through the object.

The system of any of the preceding clauses, further comprising a collimator disposed between the energy source and the detector.

The system of any of the preceding clauses, wherein the collimator comprises a plurality of openings, and wherein each of the pixels is aligned with one of the plurality of openings of the collimator.

The system of any of the preceding clauses, wherein the plurality of openings of the collimator are arranged along an arc.

The system of any of the preceding clauses, wherein the energy source comprises an x-ray energy source.

The system of any of the preceding clauses, wherein each of the pixels is to convert the received energy into an electrical signal which is then converted into an image.

The system of any of the preceding clauses, wherein each of the pixels is shaped as a rectangle in a cross-section and disposed along an arc.

The system of any of the preceding clauses, wherein each of the pixels is shaped as a trapezoid in a cross-section.

The system of any of the preceding clauses, wherein each of the pixels is separated in the array by a shielding material.

A pixel array, the pixel array comprising: a first pixel, the first pixel configured to receive energy from an energy source that has passed through an object, the first pixel having a first centerline extending longitudinally therethrough, where the first centerline is focally aligned with a focal spot of the energy source; and a second pixel, the second pixel configured to receive the energy from the energy source that has passed through the object, the second pixel having a second centerline extending longitudinally therethrough, where the second centerline is focally aligned with the energy source.

The pixel array of any of the preceding clauses, wherein the first centerline and second centerline are arranged in non-parallel relation.

The pixel array of any of the preceding clauses, further comprising shielding material disposed between the first pixel and the second pixel.

The pixel array of any of the preceding clauses, wherein the first pixel and the second pixel are shaped as a rectangle in a cross-section.

The pixel array of any of the preceding clauses, wherein the first pixel and the second pixel are shaped as a trapezoid in a cross-section.

The pixel array of any of the preceding clauses, wherein the energy source comprises an x-ray energy source.

The pixel array of any of the preceding clauses, wherein the first pixel and the second pixel convert the received energy into an electrical signal.

A method, the method comprising: emitting energy from a focal spot of an energy source, at least some of the energy passing through an object; and receiving the at least some of the energy that has passed through the object at an array of pixels, each of the pixels of the array of pixels having a centerline extending longitudinally through the pixel, the centerline of each of the pixels being focally aligned with the focal spot of the energy source.

The method of any of the preceding clauses, further comprising: wherein receiving at least some of the energy that has passed through the object comprises receiving the energy at a collimator, the collimator comprising a plurality of openings.

The method of any of the preceding clauses, wherein each of the pixels is aligned with one of the plurality of openings of the collimator.

The method of any of the preceding clauses, wherein the energy source comprises an x-ray energy source.

The method of any of the preceding clauses, wherein each of the pixels is shaped as a rectangle in a cross-section and disposed along an arc.

The method of any of the preceding clauses, wherein each of the pixels is shaped as a trapezoid in a cross-section.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A system, the system comprising:
an energy source to emit energy from a focal spot toward an object;
a detector, the detector comprising an array of pixels, each of the pixels of the array of pixels having a centerline extending longitudinally through the pixel, the centerline of each of the pixels being focally aligned with the focal spot of the energy source, each of the pixels receiving energy from the energy source that has passed through the object; and a collimator disposed between the energy source and the detector, wherein the collimator comprises a plurality of openings, and wherein each of the pixels is aligned with one of the plurality of openings of the collimator, wherein the plurality of openings of the collimator are arranged along an arc, and wherein each of the pixels is separated in the array by a shielding material.

2. The system of claim 1, wherein the energy source comprises an x-ray energy source.

3. The system of claim 1, wherein each of the pixels is to convert the received energy into an electrical signal which is then converted into an image.

4. The system of claim 1, wherein each of the pixels is shaped as a rectangle in a cross-section and disposed along an arc.

5. The system of claim 1, wherein each of the pixels is shaped as a trapezoid in a cross-section.

6. A method, the method comprising:

emitting energy from a focal spot of an energy source, at least some of the energy passing through an object; and receiving the at least some of the energy that has passed through the object at an array of pixels, each of the pixels of the array of pixels having a centerline extending longitudinally through the pixel, the centerline of each of the pixels being focally aligned with the focal spot of the energy source, wherein receiving at least some of the energy that has passed through the object comprises receiving the energy at a collimator, the collimator comprising a plurality of openings, wherein each of the pixels is aligned with one of the plurality of openings of the collimator and the plurality of openings of the collimator are arranged along an arc, and wherein each of the pixels is separated in the array by a shielding material.

7. The method of claim 6, wherein the energy source comprises an x-ray energy source.

\* \* \* \* \*